(12) United States Patent
Izpisua-Rodriguez et al.

(10) Patent No.: US 12,730,278 B2
(45) Date of Patent: Sep. 8, 2026

(54) ELECTRONIC DEVICES WITH REMOVABLE LIGHT SEALS

(71) Applicant: Apple Inc., Cupertino, CA (US)

(72) Inventors: Elias Izpisua-Rodriguez, La Jolla, CA (US); Wey-Jiun Lin, Los Altos Hills, CA (US); Forrest C Wang, Petaluma, CA (US); Yoonhoo Jo, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 572 days.

(21) Appl. No.: 18/340,710

(22) Filed: Jun. 23, 2023

(65) Prior Publication Data

US 2024/0077694 A1 Mar. 7, 2024

Related U.S. Application Data

(60) Provisional application No. 63/403,462, filed on Sep. 2, 2022.

(51) Int. Cl.
*G02B 7/00* (2021.01)
*G06F 1/16* (2006.01)

(52) U.S. Cl.
CPC ............. *G02B 7/003* (2013.01); *G06F 1/163* (2013.01)

(58) Field of Classification Search
None
See application file for complete search history.

(56) References Cited

U.S. PATENT DOCUMENTS 9,057,826 B2 6/2015 Gupta et al.
9,250,444 B2 2/2016 Magyari
9,298,012 B2 3/2016 Bohn et al.
10,146,054 B2 12/2018 Martinez et al.
11,796,823 B1 * 10/2023 Ebert ................. G02B 27/0176
2006/0072206 A1 * 4/2006 Tsuyuki ............. G02B 27/0172 348/E13.041
2013/0321925 A1 12/2013 Jacobs et al.
2016/0005231 A1 * 1/2016 Yamaga ............... H04N 13/344 345/633
2017/0168303 A1 * 6/2017 Petrov .................... G02C 11/08
2018/0003919 A1 * 1/2018 Song ......................... G02B 7/04
2018/0048911 A1 * 2/2018 Jeon ..................... H04N 19/157
2019/0041643 A1 * 2/2019 Chang .................. H04N 13/398
2020/0033560 A1 1/2020 Weber et al.

(Continued)

FOREIGN PATENT DOCUMENTS

WO 2022119679 A1 6/2022
WO 2023192793 A1 10/2023

*Primary Examiner* — Robert E. Tallman

(74) *Attorney, Agent, or Firm* — Treyz Law Group, P.C.; David K. Cole

(57) ABSTRACT

A head-mounted device may include optical assemblies for presenting images to a user. Motors may be used to adjust the spacing between the optical assemblies to accommodate different interpupillary distances. The head-mounted device may have a housing that receives a custom-fit removable light seal with vision correction lenses. A sensor or wireless transceiver in the housing may receive interpupillary distance information from the light seal. Based on this information, the motors may adjust the optical assemblies so that the optical assemblies are spaced apart by an amount that matches the interpupillary distance associated with the user of the custom-fit removable light seal.

20 Claims, 4 Drawing Sheets

(56) References Cited

U.S. PATENT DOCUMENTS

2020/0064635 A1 2/2020 Franklin et al.
2020/0326543 A1 10/2020 Kim et al.
2021/0325678 A1 10/2021 Maric et al.
2024/0295735 A1 * 9/2024 Stafford .................. G06F 3/013

* cited by examiner

ELECTRONIC DEVICES WITH REMOVABLE LIGHT SEALS

This application claims the benefit of provisional patent application No. 63/403,462, filed Sep. 2, 2022, which is hereby incorporated by reference herein in its entirety.

FIELD

This relates generally to electronic devices, and, more particularly, to electronic devices such as head-mounted devices.

BACKGROUND

Electronic devices have components such as displays and lenses. It can be challenging to customize such devices for different users.

SUMMARY

A head-mounted device may include optical assemblies for presenting images to a user. Each optical assembly may have a display and a system lens through which an image from the display may be presented to a respective eye box.

Motors may be used to adjust the spacing between the optical assemblies to accommodate different user interpupillary distances. The head-mounted device may have a housing that receives a custom-fit removable light seal with vision correction lenses for the user.

As the light seal is being mounted to the housing, a sensor or wireless transceiver in the housing may receive interpupillary distance information from the light seal. Based on this information, the motors may adjust the optical assemblies so that the optical assemblies are spaced apart by an amount that matches the interpupillary distance associated with the user of the custom-fit removable light seal.

Configurations are also provided in which the motors may be omitted. In these configurations, cooperative mechanical structures in the housing and removable light seal may be used to establish a desired spacing between the optical assemblies.

DETAILED DESCRIPTION

Electronic devices such as head-mounted devices may have displays for displaying images and lenses that are used in presenting the images to eye boxes for viewing by a user. Different users have different eyeglass prescriptions and face shapes. To accommodate the prescription and face shape of a given use, an electronic device may be provided with a removable portion that is customized for the given user. The removable portion, which may sometimes be referred to as a removable housing portion or removable light seal may contain user-customized lenses (sometimes referred to as prescription lenses or vision correction lenses) and may have a shape that is matched to a user's face.

Figure 1:
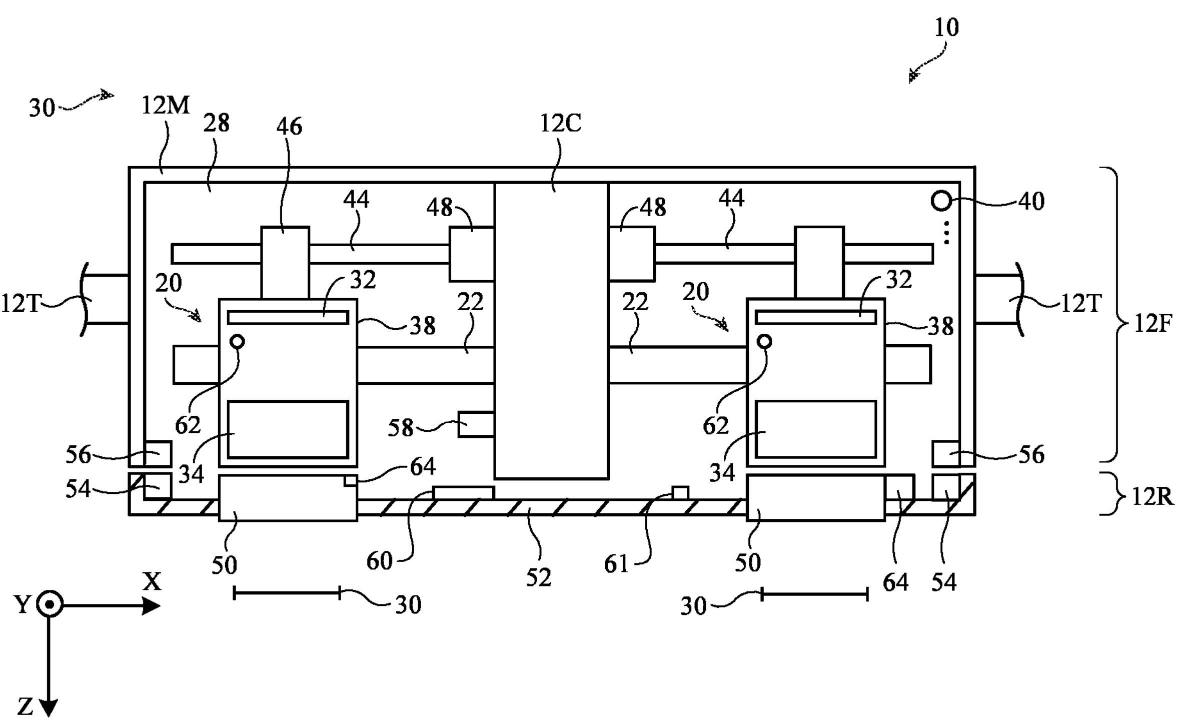
FIG. 1 is a diagram of an illustrative head-mounted device in accordance with an embodiment.

FIG. 1 is a schematic diagram of an illustrative electronic device of the type that may include a removable custom-fit light seal with vision correction lenses. Device 10 of FIG. 1 may be a head-mounted device (e.g., goggles, glasses, a helmet, and/or other head-mounted device. In an illustrative configuration, device 10 is a head-mounted device such as a pair of goggles (sometimes referred to as virtual reality goggles, mixed reality goggles, augmented reality glasses, etc.).

As shown in the illustrative cross-sectional top view of device 10 of FIG. 1, device 10 may have a housing such as housing 12 (sometimes referred to as a head-mounted support structure or head-mounted support). Housing 12 may include a front portion such as front portion 12F and a removable rear portion such as rear portion 12R. When device 10 is worn on the head of a user, rear portion 12R rests against the face of the user and helps block stray light from reaching the eyes of the user. Because of these light sealing properties, rear portion 12R may sometimes be referred to as a light seal. To enhance comfort, the shape of portion 12R may be matched to the shape of the user's face, so removable rear portion 12R may sometimes be referred to as a custom-fit removable light seal or custom-fit removable housing portion.

Front portion 12F of device 10 has main portion 12M (sometimes referred to as a main unit) and other head-mounted support structures such as head strap 12T. Main portion 12M may have a rigid shell formed from housing walls of polymer, glass, metal, and/or other materials. When housing 12 is being worn on the head of a user, the front of housing 12 may face outwardly away from the user, the rear of housing 12 may face towards the user, and the user's eyes may be located in eye boxes 36.

Device 10 may have electrical and optical components that are used in displaying images to eye boxes 36 when device 10 is being worn. These components may include left and right optical assemblies 20 (sometimes referred to as optical modules). Each optical assembly 20 may have an optical assembly support 38 (sometimes referred to as a lens barrel or optical module support) and guide rails 22 along which optical assemblies 20 may slide to adjust optical-assembly-to-optical-assembly separation to accommodate different user interpupillary distances.

Each assembly 20 may have a display 32 that has an array of pixels for displaying images and a lens 34 (sometimes referred to as a main lens, fixed lens, or system lens). In each assembly 20, display 32 and lens 34 may be coupled to and supported by support 38. During operation, images displayed by displays 32 may be presented to eye boxes 36 through lenses 34 for viewing by the user. Some users have vision defects (e.g., refractive errors such as nearsightedness, farsightedness, and/or astigmatism). These vision defects can be corrected with user-specific prescription lenses such as vision correction lenses 50. As shown in FIG. 1, lenses 50 may be aligned with lenses 34, so that images displayed by displays 32 are presented to eye boxes 36 through lenses 34 and overlapping lenses 50.

As shown in FIG. 1, rear portion 12R may include rear housing structures such as rear housing layer 52. Layer 52 may include rigid portions (e.g., a polymer layer, a polymer frame, etc.) and/or flexible portions (e.g., a flexible polymer layer, a flexible fabric layer, etc.). Layer 52, which may sometimes be referred to as a custom-fit layer or custom-fit rear housing structure, may have a shape that is customized (or semi-customized) to accommodate the facial shape of a user (e.g., so that layer 52 exactly or closely matches the facial features of a user such as the user's nose size and shape, cheek location, forehead shape, etc.). By customizing layer 52 in this way, rear portions 12R can be produced that are different for different users, thereby allowing each user to select a rear portion 12R that fits their face and is therefore comfortable for that user.

Portion 12R may have magnets, clips, and/or other temporary attachment structures that allow portion 12R to be removably attached to front portion 12F. For example, rear portion 12R may have magnets 54 that mate with corresponding magnets 56 that are attached to main portion 12M of front portion 12F. In the event that it is desired to share device 10 among multiple users, each user may be provided with a different respective rear portion 12R that is customized for that user. When a given user is ready to use device 10, the given user's rear portion 12R may be magnetically attached or otherwise removably attached to front portion 12F, thereby customizing device 10 for the given user.

Each rear portion 12R may be provided with vision correction lenses 50 that are customized for the user associated with that rear portion. Lenses 50 may be attached to layer 52 using press-fit connections, clips, adhesive, screws, mating threaded lens holders, and/or other permanent and/or semipermanent attachment mechanisms. During normal use, lenses 50 generally need not be removed from rear portion 12R. Rather, rear portion 12R, including both the face-customized structures of layer 52 and the eye-customized structure of lenses 50 may be attached and removed from front portion 12F as one piece. This simplifies the process of customizing device 10 for different users.

The walls of housing 12 may separate interior region 28 within device 10 from exterior region 30 surrounding device 10. In interior region 28, optical assemblies 20 may be mounted on guide rails 22. Guide rails 22 may be attached to central housing portion 12C. If desired, the outer ends of guide rails 22 may be unsupported (e.g., the outer end portions of rails 22 may not directly contact housing 12, so that these ends float in interior region 28 with respect to housing 12).

Device 10 may include control circuitry and other components such as components 40. The control circuitry may include storage, processing circuitry formed from one or more microprocessors and/or other circuits. To support communications between device 10 and external equipment, the control circuitry may include wireless communications circuitry. Components 40 may include sensors such as force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or sensors such as inertial measurement units that contain some or all of these sensors), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, visual inertial odometry sensors, and/or other sensors. In some arrangements, devices 10 may use sensors to gather user input (e.g., button press input, touch input, etc.). Sensors may also be used in gathering environmental motion (e.g., device motion measurements, temperature measurements, ambient light readings, etc.).

Optical assemblies 20 may have gaze tracker sensors 62 (sometimes referred to as gaze trackers). Sensors 62 may include one or more light sources such as infrared light-emitting diodes that emit infrared light to illuminate the eyes of a user in eye boxes 36. Sensors 62 also include infrared cameras for capturing images of the user's eyes and measuring reflections (glints) of infrared light from each of the infrared light sources. By processing these eye images, sensors 62 may track the user's eyes and determine the point-of-gaze of the user.

Different users have different spacings between their eyes. A user's eye-to-eye spacing is referred to as their interpupillary distance. To accommodate users with different interpupillary distances, the spacing between the left and right optical assemblies 20 in device 10 can be adjusted. Device 10 may have left and right actuators (e.g., motors) such as motors 48. Each motor 48 may be used to rotate an elongated threaded shaft such as screw 44. A nut 46 is provided on each screw 44. The nut has threads that engage the threads on that screw 44. When a screw is rotated, the nut on the screw is driven in the +X or −X direction (in accordance with whether the screw is being rotated clockwise or counter-clockwise). In turn, this moves the optical assembly 20 that is attached to the nut in the +X or −X direction along its optical assembly guide rail 22. Each assembly 20 (e.g., support 38) may have portions that receive one of guide rails 22 so that the assembly is guided along the guide rail. By controlling the activity of motors 48, the spacing between the left and right optical assemblies of device 10 can be adjusted to accommodate the interpupillary distance of different users. For example, if a user has closely spaced eyes, assemblies 20 may be moved inwardly (towards each other) and if a user has widely spaced eyes, assemblies 20 may be moved outwardly (away from each other).

In addition to adjusting the spacing between assemblies 20 so that displays 32 and lenses 34 are spaced apart by a distance that matches a user's interpupillary distance, the lens-to-lens spacing of vision correction lenses 50 in rear portion 12R should match the user's interpupillary distance. The lens-to-lens spacing of lenses 50 on rear portion 12R may be adjustable or fixed. In an illustrative adjustable lens spacing arrangement, rear layer 52 is flexible so that layer 52 can stretch to accommodate changes to the lens-to-lens spacing of lenses 50. In an illustrative fixed lens spacing arrangement, rear layer 52 may have one or more rigid portions that resist or prevent changes in the spacing between lenses 50.

Consider, as an example, a scenario in which rear portion 12R has been customized to accommodate a person with a small nose and a large interpupillary distance. In this situation, layer 52 is provided with a nose bridge portion that has a small nose recess and lenses 50 are mounted far apart on layer 52. When the user desires to use device 10, rear layer 12R is moved into proximity of the rear of front portion 12F, so that rear portion 12R may be coupled to front portion 12F (e.g., magnets 54 on rear portion 12R may be moved into alignment with magnets 56 on front portion, so that magnetic attraction pulls rear portion 12R onto front portion 12F). Motors 48 may adjust the positions of optical assemblies 20 to match the user's interpupillary distance and thereby ensure that lenses 34 are spaced apart by the same amount as lenses 50 on rear portion 12R.

Device 10 (e.g., circuitry in front portion 12F) may obtain information on the appropriate spacing to use for assemblies 20 during or prior to attachment of rear portion 12R. As an example, gaze tracker sensors 62 (e.g., an image sensor in sensors 62) or other image sensor may capture an image of a fiducial, bar code, or other information on one or near one or both of lenses 50 (see, e.g., fiducials 64). Fiducials 64 may serve as codes that contain information on the interpupillary distance of the user associated with rear portion 12R and therefore the spacing between lenses 50 on rear portion 12R. In response to obtaining the interpupillary distance information from portion 12R, motors 48 can adjust the spacing of assemblies 20 to match the spacing of lenses 50 and the user's interpupillary distance. If desired, other arrangements may be used for obtaining interpupillary distance information from rear portion 12R. As an example, device 10 (e.g., front portion 12F) may have a sensor such as sensor 58 that reads coded interpupillary distance information from code (coded information) 60 on portion 12R using optical sensing, radio-frequency sensing, magnetic sensing, resistance sensing, and/or other types of sensing. If desired, other components (see, e.g., components 40) may include wireless communications circuitry (e.g., a near-field communications circuit or Bluetooth® circuit). The wireless circuit may communicate wirelessly with a corresponding wireless transceiver such as transceiver 61 in portion 12R. By wireless communications (e.g., near-field communications, local wireless area network communications, and/or other wireless communications, coded information (e.g., a code representing the interpupillary distance of portion 12R) may be conveyed from portion 12R to portion 12F, so that motors 48 may adjust the spacing of optical assemblies 20 to match the lens-to-lens spacing of lenses 50 in portion 12R (e.g., to match the user's interpupillary distance). As these examples demonstrate, portion 12F (e.g., sensors and/or wireless transceiver circuitry) may extract interpupillary distance information from a customized light seal (portion 12R) and can therefore adjust the optical assembly spacing of assemblies 20 using motors 48.

Figure 2:
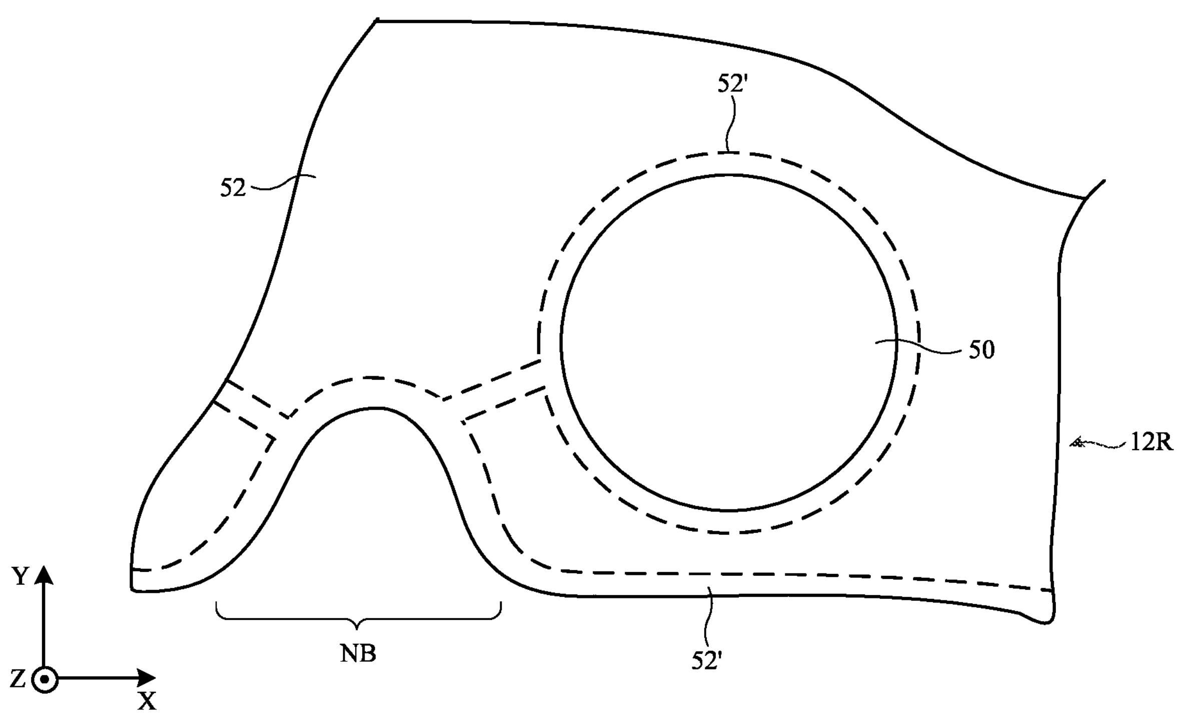
FIG. 2 is a rear view of a portion of an illustrative head-mounted device in accordance with an embodiment.

FIG. 2 is a rear view of part of rear portion 12R showing how lenses 50 may be mounted to layer 52. Layer 52 may include flexible and/or rigid materials. If desired, layer 52 may include rigid frame structures, a foam ring (e.g., a soft peripheral ring that serves as a cushion between device 10 and the face of the user), and/or other structures (see, e.g., illustrative structures 52', which may include a cushioning ring, frame structures, lens supports, etc.). Layer 52 may have a custom fit adapted to provide comfort for a particular user (or a set of similar users). For example, a custom-fit recess with a three-dimensional nose shape such as nose bridge portion NB may be configured to rest comfortably on or near the nose of the user. Other portions of rear portion 12R (e.g., the overall shape of layer 52) may also be customized to accommodate the face of the user. Lenses 50 may be maintained with a fixed lens-to-lens spacing in layer 52 (e.g., in a scenario in which the spacing between assemblies 20 is adjusted prior to attachment of rear portion 12R to front portion 12F) or layer 52 may be flexible so that the spacing between lenses 50 may be adjusted as lenses 50 travel with assemblies 20 (e.g., in a scenario in which lenses 50 are snapped into place or otherwise coupled to supports 38 before assemblies 20 are moved with motors 48).

Figure 3:
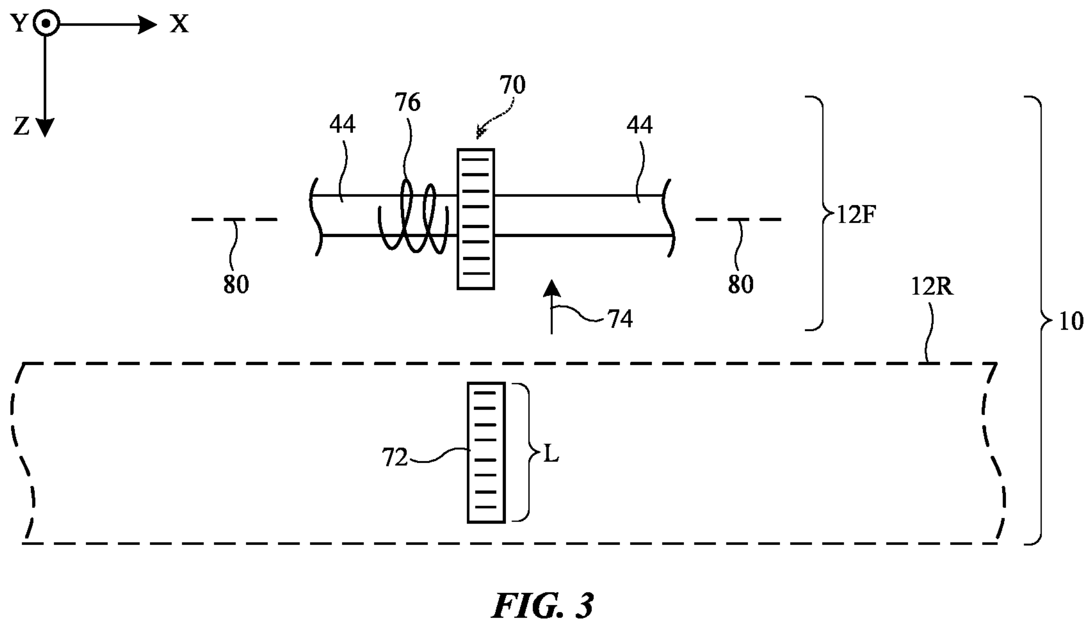
FIG. 3 is a top view of parts of an illustrative electronic device in accordance with an embodiment.

If desired, motors 48 may be omitted. In this type of arrangement, front portion 12F and rear portion 12R may be provided with structures that cooperate to adjust optical assembly spacing to match the interpupillary distance of the user (e.g., by causing movement of assemblies 20 by an amount that is specified by the rear portion 12R being attached to device 10). Consider, as an example, the arrangement of FIG. 3. FIG. 3 is a top view of a portion of device 10 showing how rear portion 12R and front portion 12F may have mating mechanical structures such as gear 70 in front portion 12F and toothed track 72 in rear portion 12R. Gear 70 may be attached to one or more shafts such as shaft 44. When portion 12R is absent, a spring such as spring 76 may be used to rotate shaft 44 so that optical assemblies 20 are spaced apart by a maximum resting distance. When rear portion 12R is attached to portion 12F, track 72 and gear 70 interact to adjust the spacing between assemblies 20.

Toothed track 72 in rear portion 12R may have a length L that is matched to the separation distance between the lenses 50 in rear portion 12R and that is therefore matched to the user's interpupillary distance. If, as an example, the spacing between lenses 50 is small (because portion 12R has been customized for a user with small interpupillary distance), length L may be large. If the spacing between lenses 50 is large (and the user's interpupillary distance is large), length L may be small. When portion 12R is attached to portion 12F (e.g., by sliding portion 12R in direction 74), the teeth on toothed track 72 will engage corresponding teeth in gear 70, causing shaft 44 to rotate about axis 80 by an amount that is proportional to length L. The rotation of shaft 44, in turn, will rotate nuts 46 of FIG. 1 and thereby move optical assemblies 20 towards each other by an amount that is proportional to L. When L is small, optical assemblies 20 will be moved towards each other by a correspondingly small amount and the resulting spacing between assemblies 20 will match a large user interpupillary distance. When L is large, optical assemblies 20 will be moved towards each other by a correspondingly large amount and the resulting spacing between assemblies 20 will match a small user interpupillary distance. If desired, other types of cooperative mechanical structures in portions 12F and 12R (e.g., structures based on pins and cones, structures based on worm gears and mating toothed members, structures based on ramps and wheels, etc.) may be used to mechanically adjust the spacing of assemblies 20 as portion 12R is attached to portion 12F. The use of cooperative mechanical structures such as toothed track 72 and gear 70 of FIG. 3 is illustrative.

Figure 4:
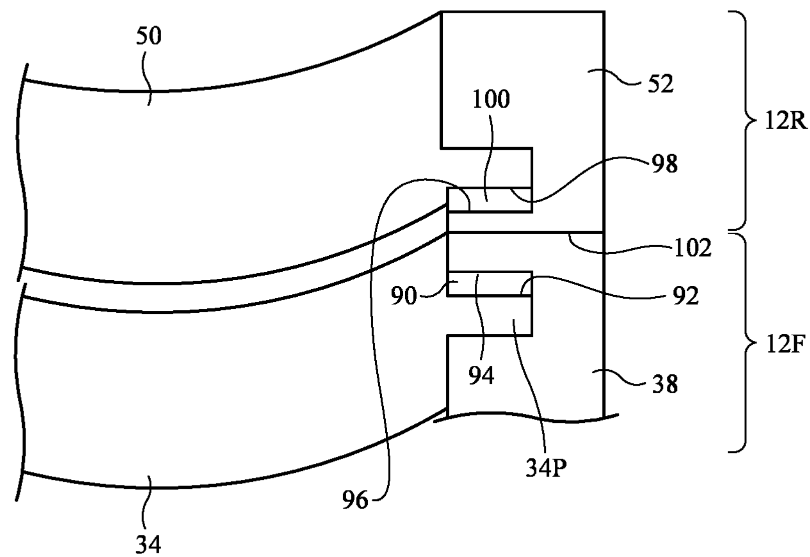
FIGS. 4 and 5 are cross-sectional views of portions of an illustrative head-mounted device in accordance with embodiments.
Figure 5:
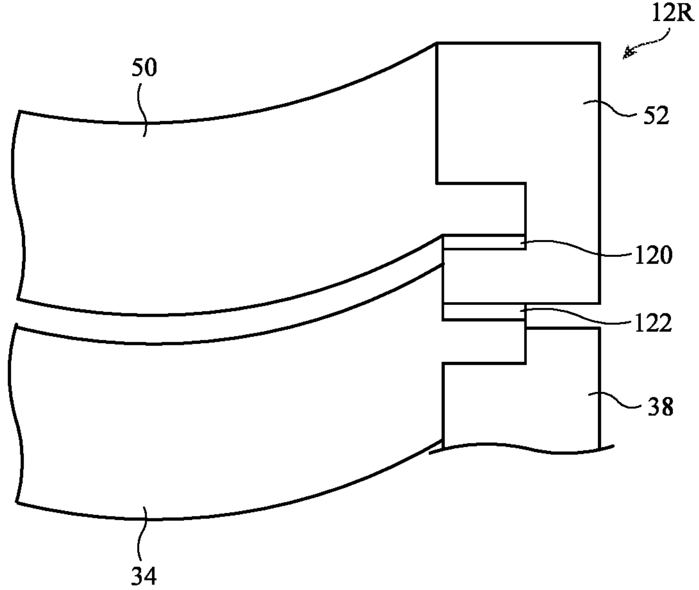

FIGS. 4 and 5 are cross-sectional side views of portions of device 10 showing how lenses 50 and 34 may be mounted. In the illustrative arrangement of FIG. 4, lens 34 is attached to support 38 using adhesive 90. Lens surface 92 and support surface 94 serve as reference surfaces (datums) to help accurately establish a desired spacing between lens 34 and display 32 in support 38. Surface 92 may be formed on a protruding portion of lens 34 such as portion 34P, may be formed on a non-protruding flat portion of lens 34, may be formed on a beveled edge of lens 34, and/or may be formed on other portions of lens 34. Portion 12R may have a support such as a portion of layer 52 (e.g., a frame structure or other portion 52' of layer 52, etc.) that has a reference surface such as surface 96 that is attached to a corresponding reference surface of lens 50 such as surface 98 with adhesive 100. Surface 98 may be formed on a protruding portion of lens 50, a flat portion of a non-protruding part of lens 50, a beveled edge of lens 50, and/or other portion of lens 50. When portion 12R is attached to portion 12F, mating reference surfaces of layer 52 and support 38 meet at interface 102. The location of interface 102 relative to surfaces 96 and 98 and relative to surfaces 92 and 94 helps accurately establish a desired spacing between lens 50 and lens 34 and between lens 50 and the display in support 38.

With the mounting arrangement of FIG. 5, portion 12R (e.g., layer 52) may have a reference surface that is attached to a corresponding reference surface of lens 50 with adhesive 120 and may have a reference surface that is attached to lens 34 with adhesive 122. In this type of configuration, lens 34 travels with lens 50 in portion 12R and the remaining portions of assemblies 20 form part of portion 12F. Magnets or other removable attachment structures may be used to attach portion 12R and 12F (e.g., at interface 124 between support 38 and lens 34). In another embodiment, both lenses 50 and lenses 34 may be fixedly attached to supports 38 so that optical assemblies 20 form part of removable rear housing portion 12R, whereas remaining portions of device 10 are part of a separate front portion 12F.

In some embodiments, sensors may gather personal user information. To ensure that the privacy of users is preserved, all applicable privacy regulations should be met or exceeded and best practices for handling of personal user information should be followed. Users may be permitted to control the use of their personal information in accordance with their preferences.

The foregoing is merely illustrative and various modifications can be made to the described embodiments. The foregoing embodiments may be implemented individually or in any combination.

What is claimed is:

1. A head-mounted device, comprising:

a head-mounted housing having a front portion and a rear portion that is removably attached to the front portion, wherein the rear portion has a customized-fit layer with a pair of vision correction lenses; and optical assemblies in the front portion of the head-mounted housing that are configured to provide images to respective eye boxes through the vision correction lenses.

2. The head-mounted device defined in claim 1 further comprising guide rails along which the optical assemblies slide.

3. The head-mounted device defined in claim 2 further comprising motors configured to move the optical assemblies along the guide rails.

4. The head-mounted device defined in claim 3 further comprising a sensor configured to obtain interpupillary distance information from the rear portion.

5. The head-mounted device defined in claim 4 wherein the motors are configured to move the optical assemblies along the guide rails based on the obtained interpupillary distance information.

6. The head-mounted device defined in claim 5 wherein the sensor comprises a magnetic sensor.

7. The head-mounted device defined in claim 5 wherein the sensor comprises an image sensor.

8. The head-mounted device defined in claim 5 wherein the sensor comprises a gaze tracker sensor.

9. The head-mounted device defined in claim 8 further comprising a code on the rear portion of the head-mounted housing that is sensed by the gaze tracker sensor.

10. The head-mounted device defined in claim 9 wherein the code comprises a fiducial on one of the vision correction lenses.

11. The head-mounted device defined in claim 3 further comprising a wireless transceiver configured to obtain interpupillary distance information from the rear portion.

12. The head-mounted device defined in claim 11 wherein the motors are configured to move the optical assemblies along the guide rails based on the obtained interpupillary distance information.

13. The head-mounted device defined in claim 3 wherein the front portion of the head-mounted housing and the rear portion of the head-mounted housing comprise cooperative mechanical structures that move the optical assemblies with respect to each other to match a lens-to-lens spacing associated with the vision correction lenses in the rear portion of the head-mounted housing as the rear portion of the head-mounted housing is attached to the front portion of the head-mounted housing.

14. The head-mounted device defined in claim 13 wherein the cooperative mechanical structures comprise teeth.

15. The head-mounted device defined in claim 1 wherein the customized-fit layer has a customized nose bridge portion.

16. The head-mounted device defined in claim 1 wherein each optical assembly has a system lens and a display configured to provide a respective one of the images to a respective one of the eye boxes through that system lens and a respective one of the vision correction lenses in the rear portion of the head-mounted housing.

17. A head-mounted device, comprising:

a head-mounted housing configured to receive a removable light seal having left and right vision correction lenses;

an optical assembly in the head-mounted housing that is configured to provide an image to an eye box;

a rail along which the optical assembly moves;

a motor configured to move the optical assembly along the rail; and a sensor configured to gather information from the removable light seal, wherein the motor is configured to move the optical assembly based on the information gathered by the sensor.

18. The head-mounted device defined in claim 17 wherein the sensor comprises an image sensor.

19. A head-mounted device, comprising:

a head-mounted housing configured to receive a removable light seal having left and right vision correction lenses;

an optical assembly in the head-mounted housing that is configured to provide an image to an eye box;

a rail along which the optical assembly moves;

a motor configured to move the optical assembly along the rail; and a wireless transceiver configured to gather information from the removable light seal, wherein the motor is configured to move the optical assembly based on the information gathered by the wireless transceiver.

20. The head-mounted device defined in claim 19 wherein the optical assembly has a display and has an optical assembly lens and wherein the display provides the image to the eye box through the optical assembly lens and through the left vision correction lens.

* * * * *